May 29, 1934.   J. M. BRYANT   1,960,693
LUBRICATING DEVICE FOR POWER TRANSMISSION MECHANISMS
Filed Jan. 27, 1933   2 Sheets-Sheet 1
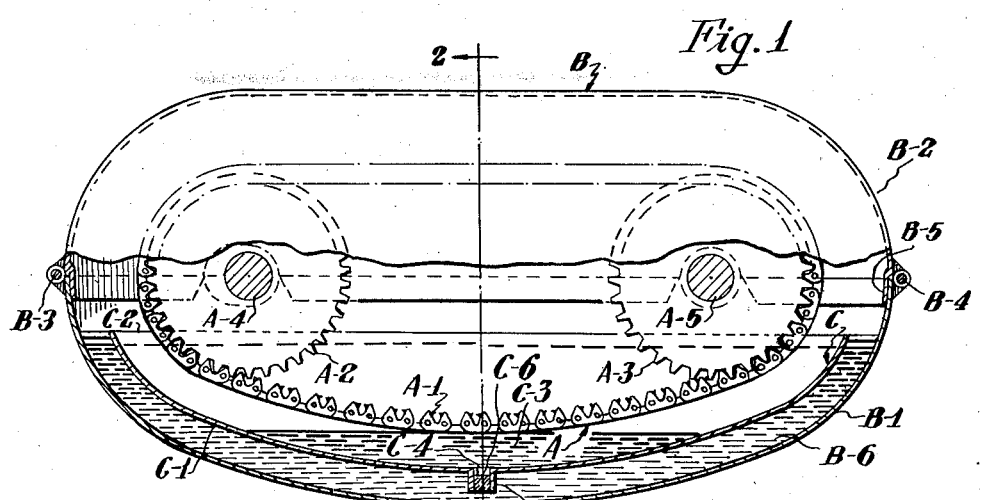
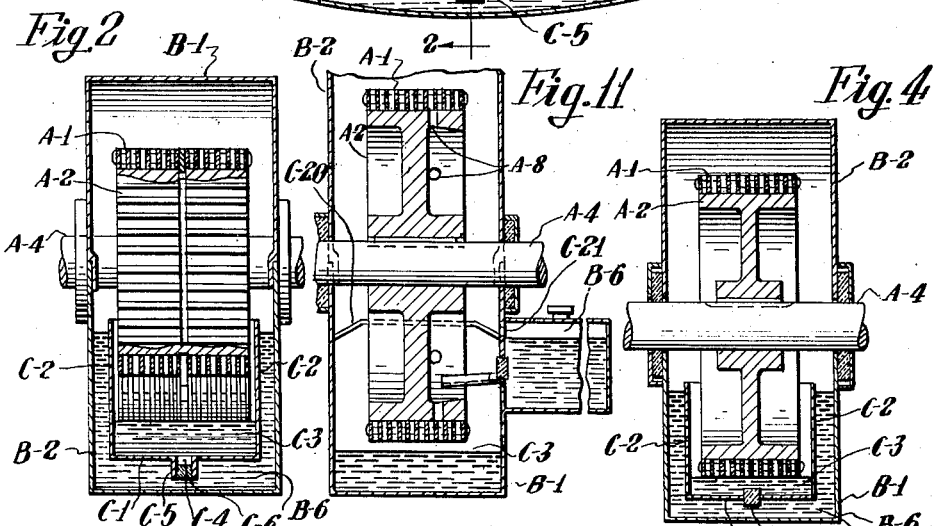
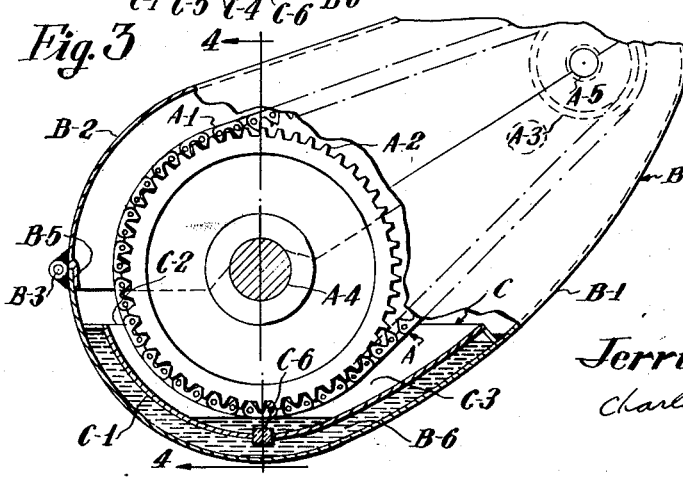
Inventor
Jerrus M. Bryant
Charles M. Lindroth
Attorney

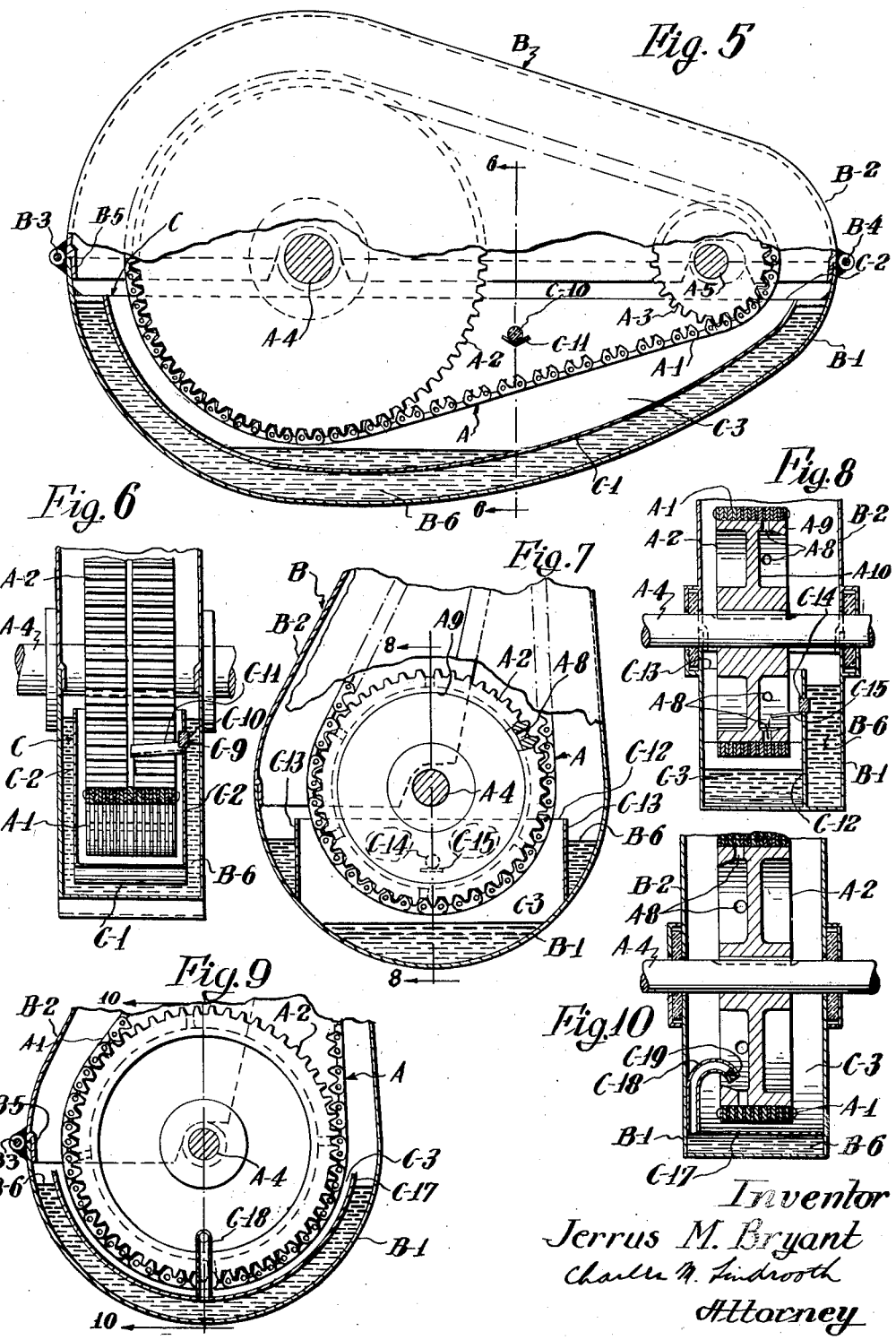

Patented May 29, 1934

1,960,693

UNITED STATES PATENT OFFICE 1,960,693

LUBRICATING DEVICE FOR POWER TRANSMISSION MECHANISMS

Jerrus M. Bryant, Indianapolis, Ind., assignor to Link-Belt Company, Chicago, Ill., a corporation of Illinois Application January 27, 1933, Serial No. 653,762

8 Claims. (Cl. 184—15)

This invention relates to improvements in lubricating devices for power transmission mechanisms and has as its principal objects to provide a new and improved means for lubricating chain drives, together with a means for automatically regulating the flow of lubricant to the same, constructed with a view towards eliminating excessive churning and heating of the lubricant, working out of the lubricant from the casing, and providing a simple, practical, and efficient lubricating system of the class described.

Other objects of my invention will appear from time to time as the following specification proceeds.

My invention may be more clearly understood with reference to the accompanying drawings, wherein:

Figure 1 is a side elevation of one form of the device embodying my invention with parts broken away and in section;

Figure 2 is a sectional view taken substantially along line 2—2 of Figure 1;

Figure 3 is a side elevation of another form of the device embodying my invention with parts broken away and in section;

Figure 4 is a sectional view taken substantially along line 4—4 of Figure 3;

Figure 5 is a side elevation of another form of the device embodying my invention with parts broken away and in section;

Figure 6 is a sectional view taken substantially along line 6—6 of Figure 5;

Figure 7 is a partial side elevation of a modified form of the device shown in Figure 5 with parts broken away and in section;

Figure 8 is a sectional view taken substantially along line 8—8 of Figure 7;

Figure 9 is a partial side elevation of another modified form of the device shown in Figure 5 with parts broken away and in section;

Figure 10 is a sectional view taken substantially along line 10—10 of Figure 9; and Figure 11 is a partial fragmentary vertical sectional view of another modified form of the device embodying my invention.

Like reference characters refer to like parts throughout the various figures.

Referring now in particular to Figures 1 and 2 of the drawings illustrating one form of the device embodying my invention, a chain drive, generally indicated by reference character A, is provided. The chain drive A may be of any type well known to those skilled in the art but is herein preferably shown as being of the well known silent chain type comprising an endless chain A—1 engaging sprocket wheels A—2 and A—3, which sprocket wheels are carried on shafts A—4 and A—5, respectively, in the usual manner.

The chain drive A is housed in a casing, generally indicated by reference character B, which comprises a lower half B—1 and an upper half B—2 hinged thereto on removable hinge pins B—3 and B—4 at opposite ends thereof in a well known manner so that when either of the hinge pins B—3 or B—4 are removed, the casing B may be opened about the opposite hinge pin permitting ready accessibility to the parts within said casing.

The upper half B—2 of the casing B is provided with an overlapping lip B—5 extending therearound which abuts and overlaps the inner side of the lower half B—1 of said casing to prevent oil from working out along the seam where said halves of said casing meet. Also, suitable means are provided to prevent leakage of oil around the shafts A—4 and A—5, which will not herein be described in detail since they are no portion of my present invention.

Referring now in particular to several of the novel features of my invention, the lower portion of the casing B serves as a storage reservoir for a lubricant, such as oil, which may be fed to the chain drive A at the desired rate in a number of ways, which will hereinafter be more fully described. As shown in Figure 1, a boot C is provided with a bottom surface C—1 conforming to and spaced from the bottom of the casing B and extending along same a substantial distance and having side walls C—2, C—2 spaced inwardly from the sides of the casing B. The boot C forms a lubricating service chamber C—3 in which the lower portion of the chain drive A may run. The space between the boot C and lower portion and sides of the lower half B—1 of the casing B forms a storage chamber or reservoir B—6 for a lubricant, such as oil.

An inlet passageway C—4 is provided in the boot C in the bottom portion thereof, and as herein shown comprises a conduit C—5 extending downwardly from the bottom surface C—1 of the boot C. The conduit C—5 is spaced from the bottom of the casing B a sufficient distance so that oil carried in the bottom of the lower half B—1 of said casing may pass through the inlet passageway C—4 into the chamber C—3. The inlet passageway C—4 may be of such a size as to regulate the passage of oil into the chamber C—3 at a relatively slow rate to permit the level of the oil in said chamber to rise to the same level as the oil in the reservoir B—6 when the drive has been idle for a considerable length of time and thus give the chain A—1 a thorough oil bath when put in operation, and maintain the level of the oil in said chamber at a lower level when said drive is running. As herein shown, I preferably insert a wick or filter C—6 in the conduit C—5 for regulating the passage of oil from the storage reservoir B—6 to the service chamber C—3. While the wick or filter C—6 may be of any suitable construction, such as a fine mesh screen or any other suitable filtering means, said filter is herein preferably shown as being made from a suitable filtering material, such as felt.

It may now be seen that oil passes from the bottom of the casing B into the lubricating chamber C—3, that the rate at which said oil enters said chamber is regulated by the filter C—6 in the inlet passageway C—4, and that said oil, being in the bottom of said casing, will be relatively cool as it passes into the service chamber C—3 and contacts with and lubricates the chain A—1. As has before been stated, when the chain drive has been idle for a considerable period the oil level in the reservoir B—6 and service chamber C—3 will be the same, and the chain A—1 will be given a thorough bath of oil when the chain drive is put in operation. After the chain drive is in operation, the chain A—1 will pick up the oil and throw it onto the sides of the casing B from which it will run into the reservoir B—6. When the chain drive has been in operation a short time, the oil level in the service chamber C—3 will drop below the level of the oil in the reservoir B—6. This is caused by the fact that the oil passes slowly through the filter C—6 between the storage reservoir B—6 and service chamber C—3 at a uniform rate which is sufficient to supply the chain drive A with ample lubricant for proper lubrication when the chain drive is running. This rate is necessarily slower than the rate at which oil is picked up by the chain A—1 when the chain drive A is put in operation for the reason that said chain is immersed in the oil to a greater extent when initially put in operation, after it has been idle a considerable time, than when running when the outside of the chain only is in contact with the oil. Thus the chain A—1 is given a thorough bath of oil when starting and the extent to which the chain drive A is lubricated is so regulated that said chain drive is automatically supplied with the proper amount of lubricant while running with no excess oil to be promiscuously thrown about the inside of the casing B.

In Figures 3 and 4, the drive is shown as being inclined about the axis of rotation of one of the sprocket wheels. The parts shown in these figures are similar to those shown in Figures 1 and 2 and the principle of lubricating the chain A—1 is the same. This form of my invention will, therefore, not be described in detail excepting to point out that the form of the upper and lower halves B—2 and B—1 of the casing B is preferably such as to permit the oil in the reservoir B—6 to attain a greater depth than would be possible if the casing shown in Figures 1 and 2 were inclined about the center of rotation of either one or the other of the sprocket wheels A—2 or A—3. Figures 3 and 4, therefore, clearly show that the principle and operation of the device of my invention is such that the chain A—1 may be lubricated as efficiently when the chain drive A is inclined about the center of rotation of one of its sprocket wheels as when running in a horizontal plane.

It should be noted that in Figures 1, 2, 3, and 4, the chain A—1 is lubricated by the application of oil to the outside of said chain except when the chain drive is initially put in operation when the entire lower portion of said chain is immersed in oil and that in Figures 5 to 11, inclusive, the chain is lubricated by the application of oil to the inside of said chain except when the chain drive is initially put in operation when the entire lower portion of said chain is immersed in oil.

Referring now to several other forms of the device embodying my invention showing other arrangements for lubricating the drive chain A—1 than are shown in Figures 1, 2, 3, and 4, and Figures 5 and 6 in particular, the lower portion of the chain drive A runs in the boot C. The boot C is secured within the lower half B—1 of the casing B in a suitable manner and is spaced therefrom so that the oil reservoir B—6 is formed between said lower half of said casing and the outside of said boot. The inside of the boot C forms the lubricating service chamber C—3 for the chain drive A and one side wall C—2 of said boot is provided with an aperture C—9 within which is inserted a filter or wick C—10 similar to that previously described. The aperture C—9 and wick or filter C—10 is located in the side wall C—2 of the boot C at a higher elevation than the inside of the lower strand of the drive chain A—1. An oil conducting member C—11 is secured to the inner side of the side wall C—2 in which the aperture C—9 is located adjacent the lower side of said aperture and extends inwardly therefrom to the center of the drive chain A—1.

It is thus apparent that when the oil in the storage reservoir B—6 is level with or above the aperture C—9 and filter C—10, that oil will seep through said filter and be discharged by the conductor C—11 on the inside of the lower strand of the drive chain A—1. When the drive has been idle for a considerable period, oil will seep through the filter C—10 and pass into the service chamber C—3 until the oil level in the storage reservoir B—6 is beneath the aperture C—9. This fills the service chamber C—3 to such an extent that the lower portion of the chain A—1 is submerged in oil and thus automatically provides a thorough oil bath for the chain A—1 when the drive is put in operation.

With reference now to the means for lubricating the inside of the chain A—1 when the drive is inclined about the axis of one or the other sprocket wheel, as shown in Figures 7 to 11, inclusive, the chain drive A is inclined about the axis of rotation of the sprocket wheel A—2 in such a manner that said sprocket wheel is of a lesser elevation than the other sprocket wheel of said chain drive. The chain A—1 is lubricated by oil passing through spaced apertures A—8 provided in a rim A—9 of the sprocket wheel A—2 adjacent one side of a web A—10 of said sprocket wheel and forming a plurality of passageways leading from the inner periphery of said rim to the outside of said sprocket wheel and inner side of the drive chain A—1. The rim A—9 of the sprocket wheel A—2 on the side of the web A—10 in which the apertures A—8 are provided is of a greater thickness adjacent its outer edge than adjacent said web, thus forming a channel in which the oil may run and pass through the apertures A—8.

In Figures 7 and 8, the lubricating chamber

C—3 is formed by a partition C—12 spaced parallel to the side walls of the lower half B—1 of the casing B closer to one side wall than the other. End walls C—13, C—13 abut opposite ends of the partition C—12 and extend therefrom to the side wall from which the partition C—12 is farthest spaced. In this arrangement the lubricating service chamber C—3 is formed by the bottom and one side of the lower half B—1 of the casing B and the inside of the partition C—12 and end walls C—13, C—13, and the storage reservoir B—6 is formed by the outside of the partition C—12, end walls C—13, C—13, and bottom and opposite side and ends of the lower half B—1 of the casing B.

A wick or filter C—14 is inserted in a suitable aperture provided in the partition C—12 in the upper portion thereof above the rim A—9 of the sprocket wheel A—2. An oil conducting member C—15 is secured to the inner side of the partition C—12 beneath the filter C—14 and extends inwardly therefrom within the limits of the rim A—9 of the sprocket wheel A—2 and its end is disposed above and in alignment with the apertures A—8 so that oil dripping from the end of said conductor will drop on the inner periphery of said rim of said sprocket wheel and through the apertures A—8 to the inside of the drive chain A—1.

When the drive is idle, oil seeping through the filter C—14 will raise the level of the oil in the lubricating chamber C—3 to such an extent that the drive chain A—1 may be given a thorough bath of oil when starting, said drive chain when running being lubricated by oil seeping through the filter C—14 and running down the conductor C—15 to the apertures A—8 in the rim A—9 of the sprocket wheel A—2.

In Figures 9 and 10, the lubricating chamber C—3 is shown as being formed by a member C—17 extending across the lower half B—1 of the casing B and spaced from and parallel to the end thereof. The oil reservoir B—6 is formed in the space between the end of the lower half B—1 of the casing B and the member C—17. A pipe C—18 is secured to the member C—17 adjacent one side of the lower half B—1 of the casing B on the transverse center line of said member. The pipe C—18 communicates with the oil reservoir B—6 and extends upwardly therefrom and is curved inwardly so it may discharge oil on on the inner periphery of the side of the rim A—9 of the sprocket wheel A—2 having the apertures A—8 therein for conducting the oil to the inner side of the drive chain A—1. For the reason that the oil level in the storage reservoir B—6 is above the pipe C—18 when the drive is running, the pressure of the oil in said storage reservoir force oil through said pipe to be discharged on the inside of the lower strand of the chain A—1 through the apertures A—8. The pipe C—18 is provided with a wick or felt filter C—19 for regulating the flow of oil through said pipe to the inner periphery of the rim A—9 of the sprocket wheel A—2.

The principle of operation of the device illustrated in Figure 11 is similar to that shown in Figures 7 to 10, inclusive, so will not be referred to in detail except to point out that the storage reservoir B—6 may be outside of the limits of the casing B and the lubricating service chamber C—3 may consist of the inside of the lower half B—1 of said casing. With this arrangement, oil running down the sides of the casing B is preferably collected by a baffle C—20 and conducted to the storage reservoir B—6 through a passageway C—21 leading from the lower half B—1 of said casing to said storage reservoir. When the casing and lubricating mechanism is arranged in such a manner, the device of my invention may readily be applied to a standard casing.

It will thus be seen that a new and improved means has been provided for lubricating chain drives constructed with a view towards eliminating excessive churning and heating of the oil, and effecting an automatically regulated flow of oil to the moving parts of the chain drive in such a manner as to provide a thorough bath of oil when the drive is put in operation and automatically regulating and limiting the amount of oil supplied to the drive thereafter.

While I have herein shown and described several forms in which my invention may be embodied, it will be understood that the construction and arrangement of the parts may be altered without departing from the spirit and scope of my invention. I do not, therefore, wish to be understood as limiting myself to the specific embodiments illustrated herein excepting as specifically limited in the appended claims.

I claim as my invention:

1. In a lubricating mechanism, the combination with a power transmission device comprising a pair of sprockets having a continuous chain running thereon, a casing therefor, the bottom portion of which forms a storage reservoir, a lubricating service chamber spaced from and within said storage reservoir in such a manner that oil within said storage reservoir may lie against the sides of said lubricating chamber, said chain running in said chamber, and automatic means for lubricating said chain in such a manner that said chain may run in oil when said transmission device is initially put in operation and be lubricated by the dropping of oil thereon after said transmission device is in operation comprising a passageway between said reservoir and chamber in one of the sides of said chamber and an oil conducting member leading from said passageway to the inside of the lower strand of said chain.

2. In a lubricating mechanism, the combination with a chain drive including a pair of sprockets having a continuous chain running thereon, a storage reservoir, a casing therefor, the bottom portion of which forms a lubricating service chamber spaced from and within said storage reservoir in such a manner that oil within said reservoir may lie against the sides of said lubricating chamber, said chain running in said chamber, and means for lubricating said chain in such a manner that said chain may run in oil when put in operation and be lubricated by the dropping of oil thereon when continuously running comprising a passageway between said reservoir and chamber in one of the sides of said chamber, an oil filtering member in said passageway and an oil conducting member leading from said passageway to said chain.

3. In a lubricating mechanism, the combination with a power transmission device comprising a pair of sprockets having a continuous chain running thereon, a casing therefor, the bottom portion of which forms a storage reservoir, a lubricating service chamber spaced from and within said storage reservoir in such a manner that oil within said reservoir may lie against the sides of said lubricating chamber, said chain running in said chamber, and means for lubricating the inside of said chain comprising a passageway in the rim of one of said sprockets, a passageway between said reservoir and chamber in one of the sides of said chamber, means in said passageway for restricting the flow of oil from said reservoir to said chamber and an oil conducting member leading from said passageway to the inner periphery of the rim of said sprocket.

4. In a lubricating mechanism, the combination with a power transmission device including a pair of sprockets having a continuous chain running thereon, a casing for said power transmission device, the lower portion of which forms a storage reservoir, a lubricating service chamber formed within said reservoir, said chain running in said chamber, and means for effecting the flow of oil from said reservoir to said chamber and regulating the flow of lubricant in such a manner that said chain will be lubricated by running in oil when put in operation and by the dropping of oil thereon when running comprising a passageway between said chamber and reservoir, a filtering member therein and an oil conductor leading from said filtering member to the inside of the lower strand of said chain.

5. In a lubricating mechanism, the combination with a power transmission device including a pair of sprockets having a continuous chain threaded thereon, a casing for said power transmission device, the lower portion of which forms a storage reservoir, a lubricating service chamber formed within said reservoir, said chain running in said chamber, and means for effecting the flow of oil from said reservoir to said chamber and automatically regulating the flow of lubricant in such a manner that said chain will be lubricated by running in oil when put in operation and by the dropping of oil thereon when running comprising a passageway between said reservoir and chamber, a filtering member therein, an apertured portion in the rim of one of said sprockets forming a passageway leading from the inner periphery thereof to the inner side of said chain and an oil conductor leading from said filtering member to said apertured portion of the rim of said sprocket.

6. In a lubricating mechanism, a pair of sprockets having a drive chain thereon, a casing for said chain and sprockets, a boot formed within and spaced from said casing encasing the lower portion of said chain and one of said sprockets, the inside of said boot forming a lubricating service chamber and the space between said boot and casing forming a storage reservoir, and means for lubricating said chain in such a manner that said chain may be lubricated to a greater extent when put in operation than when running and that the oil may continually circulate from said reservoir to said chamber and back to said reservoir when said chain is in operation comprising means whereby the oil thrown from said chain may be collected by the inside of said casing and run into said reservoir and a passageway between said reservoir and casing having a filtering member therein.

7. In a lubricating mechanism, a pair of sprockets having a drive chain thereon, a casing for said chain and sprockets, a boot formed within and spaced from said casing partially encasing the lower portion of said chain and one of said sprockets, the inside of said boot forming a lubricating service chamber and the space between said boot and casing forming a storage reservoir, and automatic means for lubricating said chain in such a manner that said chain may be lubricated by submersion in oil when put in operation and by the dripping of oil on the inside of the lower strand thereof when running and in such a manner that oil may continually circulate from said reservoir to said chamber and back to said reservoir comprising means whereby the oil thrown by said chain may be collected on the inside of said casing and run into said reservoir, a passageway between said reservoir and casing located in the side of said boot above the inside of the lower strand of said chain, an oil conducting member leading from said passageway to the inner side of the lower strand of said chain and an oil filtering member in said passageway.

8. In a lubricating mechanism, a pair of sprockets having a drive chain thereon, a casing for said chain and sprockets, a boot formed within and spaced from said casing encasing the lower portion of said chain and one of said sprockets, the inside of said boot forming a lubricating service chamber and the space between said boot and casing forming a storage reservoir, and means for lubricating said chain in such a manner that said chain may be lubricated by submersion in oil when put in operation and by the dripping of oil thereon when running and in such a manner that oil may continually circulate from said reservoir to said chamber and back to said reservoir comprising means whereby the oil thrown by said chain may be collected on the inside of said casing and run into said reservoir, a passageway between said reservoir and casing located in the side of said boot above the inner side of the lower strand of said chain, an oil conducting member leading from said passageway within the boundaries of one of said sprockets adjacent the inner periphery of the rim thereof, and a passageway in the rim of said sprocket in alignment with the discharge end of said oil conducting member leading to the inside of said drive chain.

JERRUS M. BRYANT.

CERTIFICATE OF CORRECTION.

Patent No. 1,960,693.  May 29, 1934.

JERRUS M. BRYANT.

It is hereby certified that error appears in the printed specification of the above numbered patent requiring correction as follows: Page 3, line 51, strike out "on" second occurrence; line 59, before "force" insert will; and line 89, strike out "the" first occurrence; and that the said Letters Patent should be read with these corrections therein that the same may conform to the record of the case in the Patent Office.

Signed and sealed this 24th day of July, A. D. 1934.

Bryan M. Battey (Seal)  Acting Commissioner of Patents.